Patented Apr. 8, 1924.

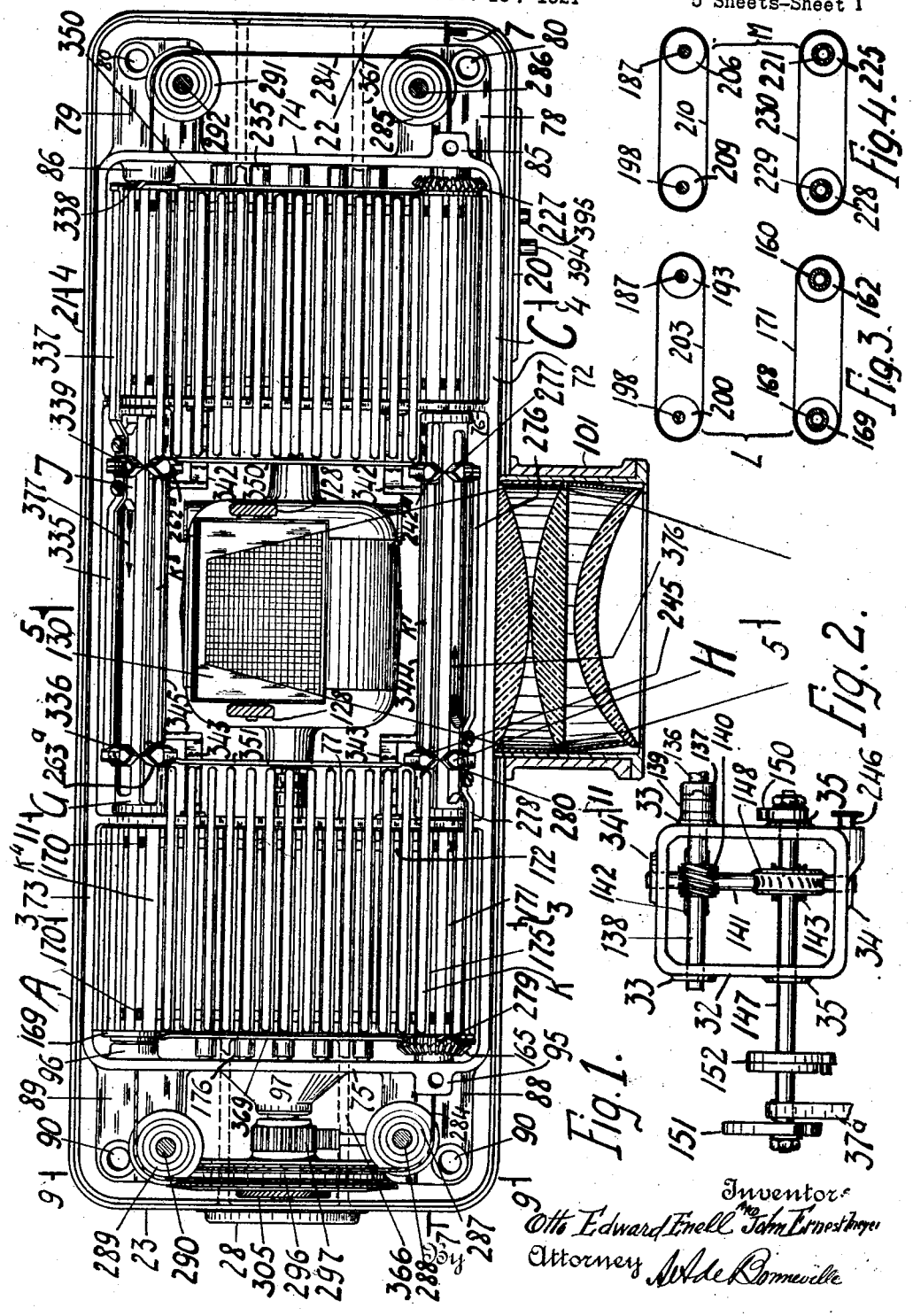

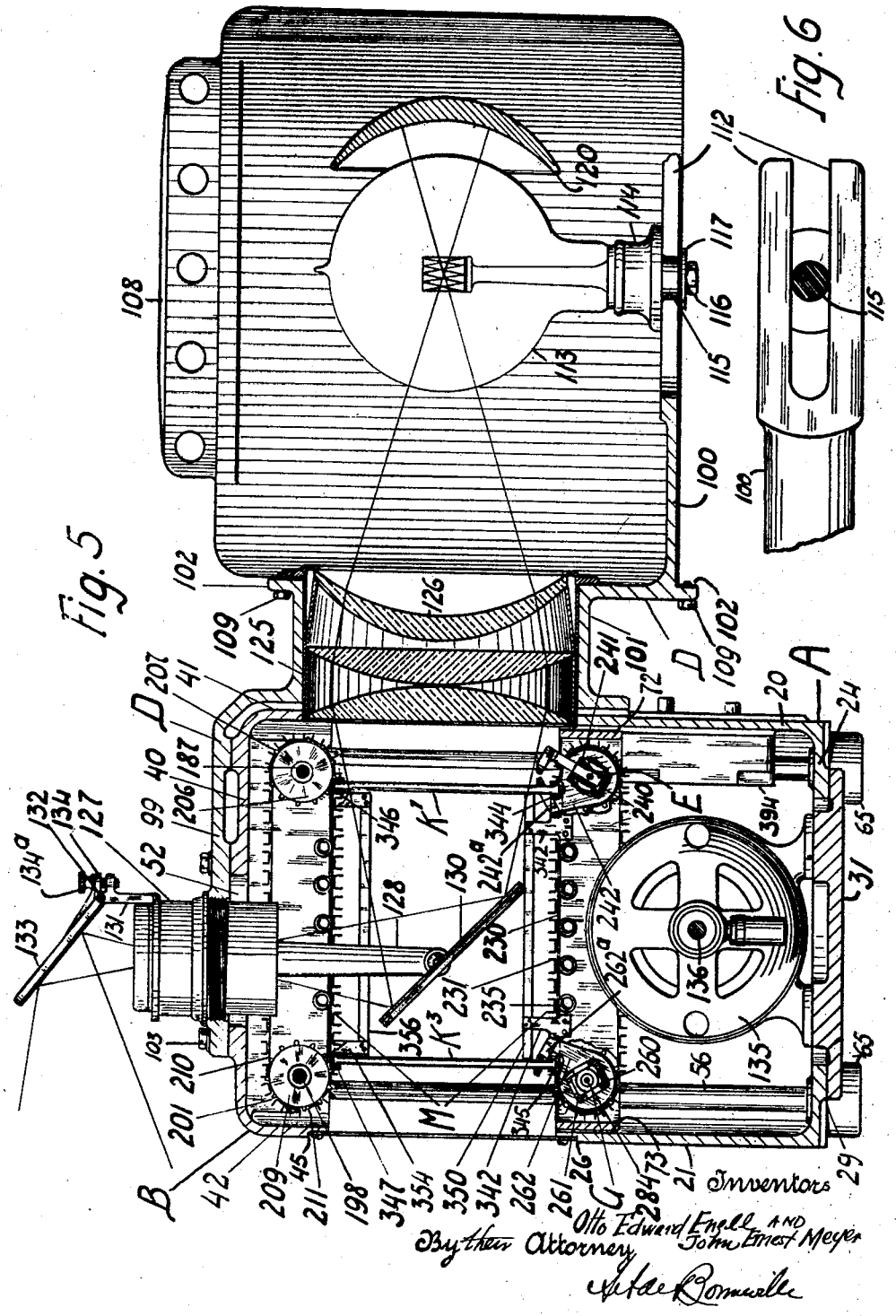

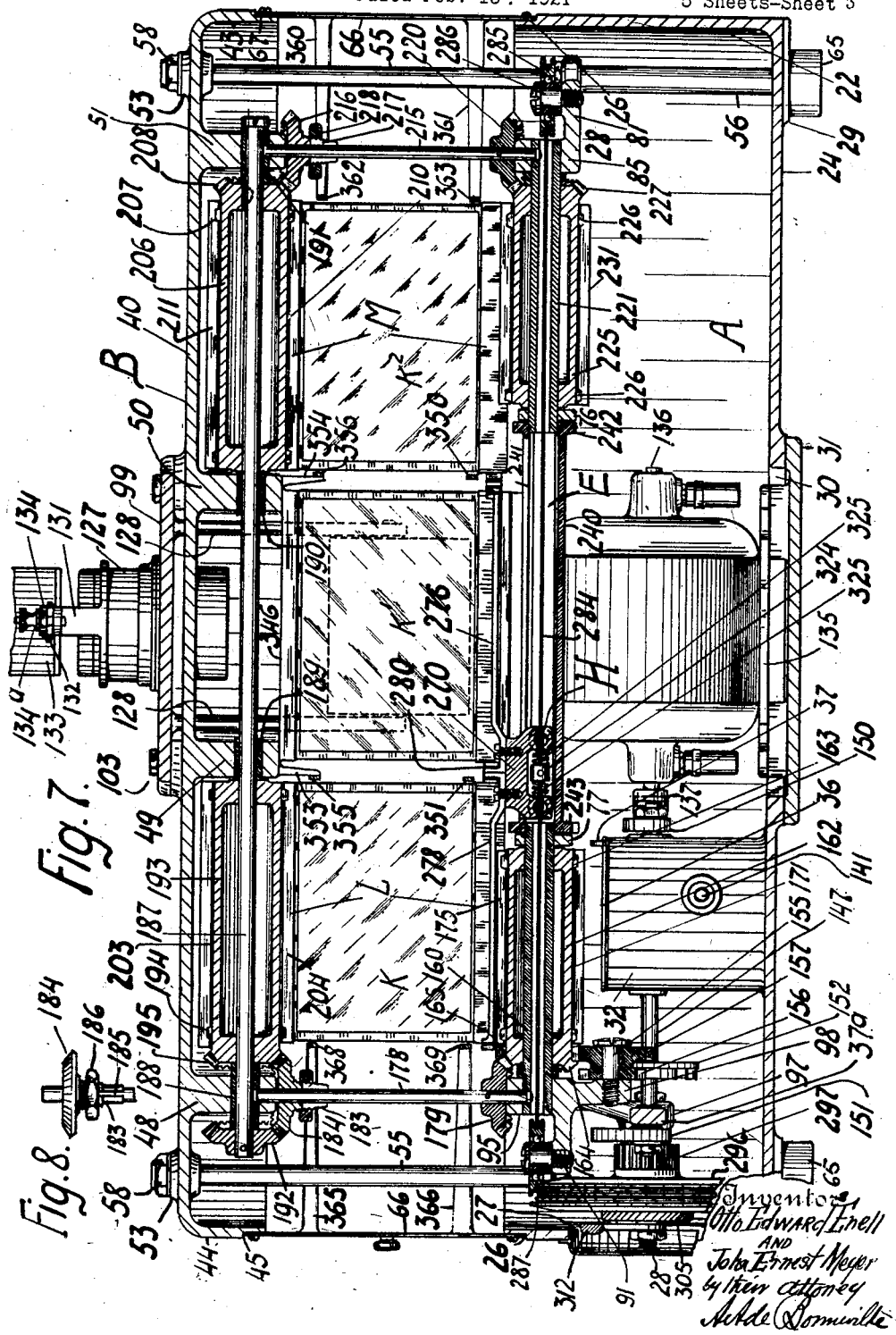

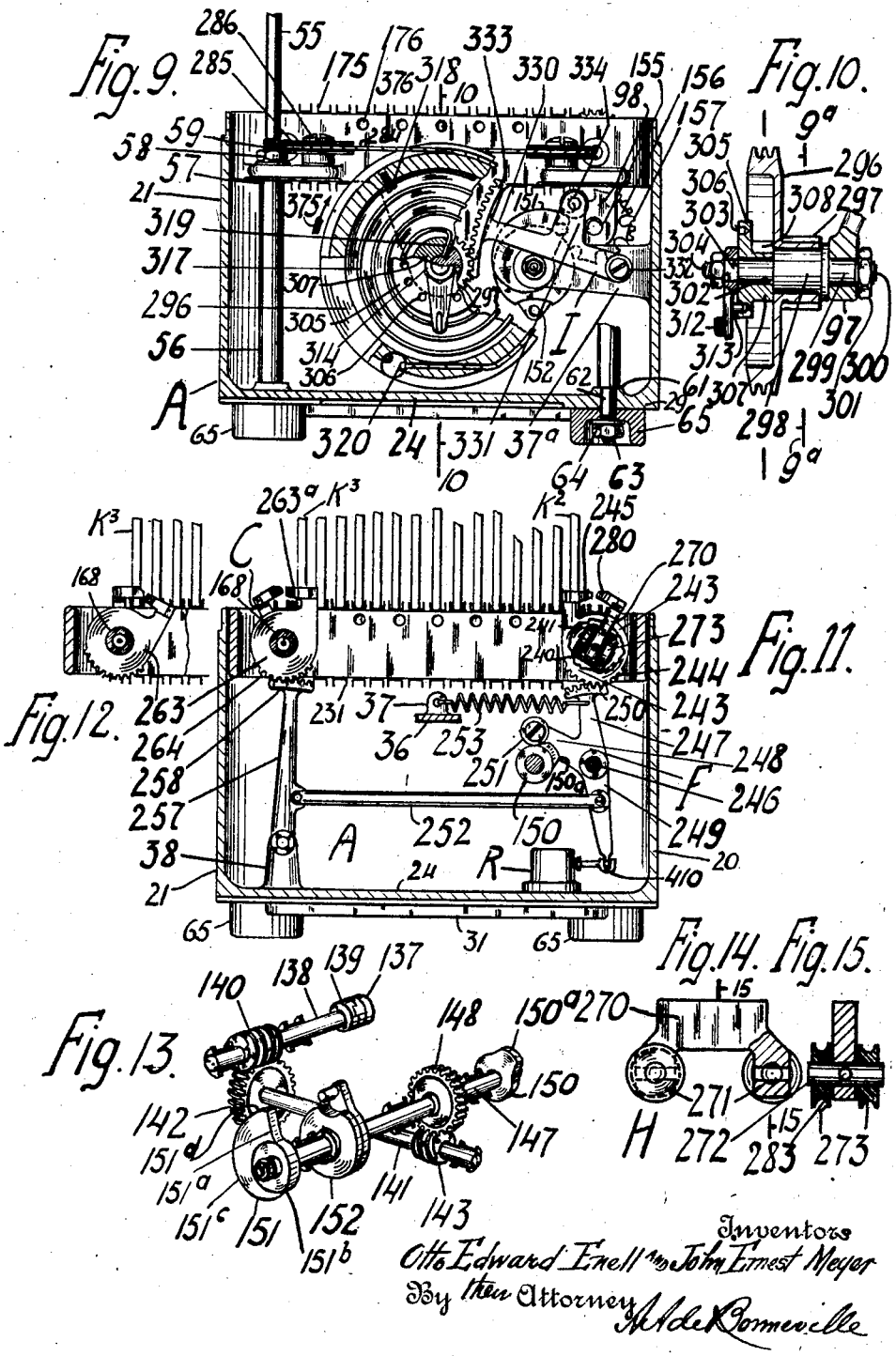

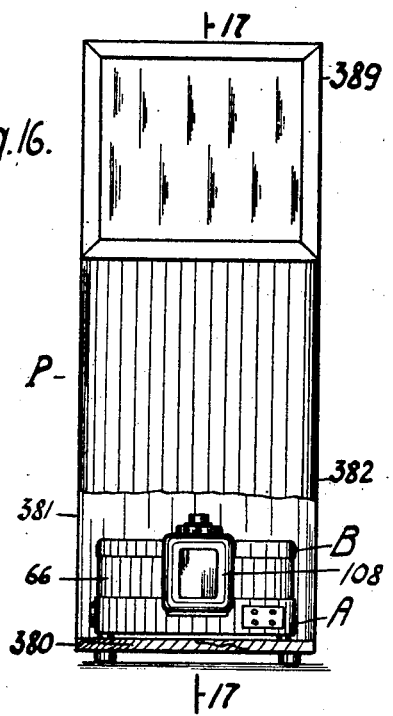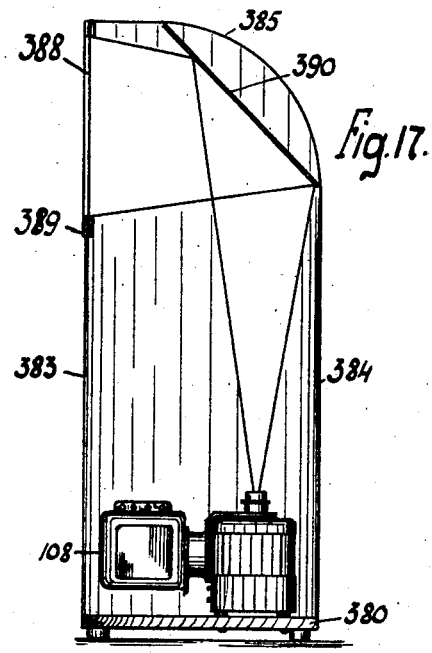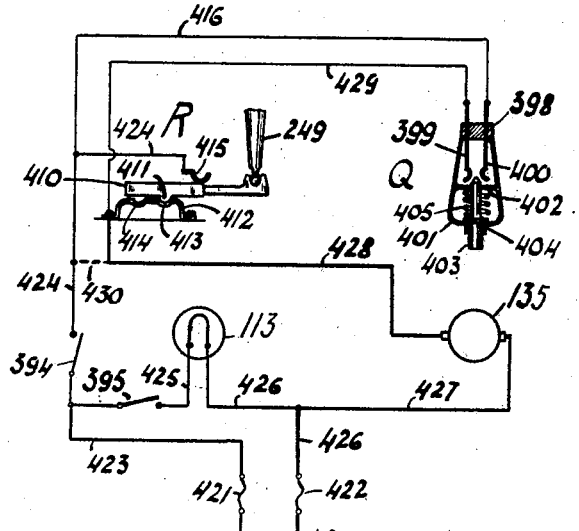

1,489,632

UNITED STATES PATENT OFFICE.

OTTO EDWARD ENELL, OF JERSEY CITY, NEW JERSEY, AND JOHN ERNEST MEYER, OF NEW YORK, N. Y., ASSIGNORS, BY MESNE ASSIGNMENTS, TO VICTOR THORNE, OF NEW YORK, N. Y.

AUTOMATIC OPTICAL PROJECTOR.

Application filed February 15, 1921. Serial No. 445,062.

*To all whom it may concern:*

Be it known that we, OTTO EDWARD ENELL and JOHN ERNEST MEYER, citizens, respectively, of the United States and the Republic of Switzerland, and residents, respectively, of Jersey City, in the county of Hudson and State of New Jersey, and of the borough of Manhattan, city of New York, county of New York, and State of New York, have jointly invented certain new and useful Improvements in an Automatic Optical Projector, of which the following is a specification.

This invention relates to an automatic optical projector.

The object of the invention is the production of an optical projector by means of which a series of separate pictures are one after the other projected on a screen, the pictures remaining in view short intervals of time, and a further object of the invention is to maintain the pictures on the screen for intervals of time controlled by the user.

The organization of the invention comprises essentially two pairs of horizontal moving conveyers. One pair of conveyers spaced from the other pair and moving slides with pictures to the front of the projector and the other pair of conveyers moving slides to the rear of the projector.

Means are provided to shift the slides quickly at the front of the projector to the space between the conveyers, and simultaneously to shift the slides to the space between the conveyers at the rear of the projector. The picture on the slide between the conveyers at the front of the projector is projected on a screen.

Fig. 1 represents a top plan view of an exemplification of the automatic optical projector with the cover thereof removed; Fig. 2 shows a top plan view of some details; Fig. 3 shows a diagrammatic section of some details on the line 3, 3 of Fig. 1; Fig. 4 shows a diagrammatic section of some details on the line 4, 4 of Fig. 1; Fig. 5 is a partial section of the projector as on the line 5, 5 of Fig. 1; Fig. 6 represents a plan view of a fragmentary portion of Fig. 5; Fig. 7 is a section of Fig. 1 on the line 7, 7; Fig. 8 shows an elevation of a detail; Fig. 9 shows cross sections of the projector taken on the line 9, 9 of Fig. 1 and the line 9a, 9a of Fig. 10; Fig. 10 is a partial cross section of Fig. 9 on the line 10, 10; Fig. 11 shows a cross section of Fig. 1 on the line 11, 11; Fig. 12 is a fragmentary portion of Fig. 11 with some of the elements in a different position; Fig. 13 shows a perspective view of the cam shaft of the projector and some of its appurtenances; Fig. 14 shows an element of the projector partly in vertical section; Fig. 15 is a section of Fig. 14 on the line 15, 15; Fig. 16 represents a front elevation of the projector on a reduced scale and an elevation of a cabinet therefor partly in vertical section; Fig. 17 is in part a left hand side view and section of Fig. 16 on the line 17, 17 and Fig. 18 shows a diagrammatic view of the electrical appurtenances of the projector.

This exemplification of the automatic optical projector is represented to consist of the housing indicated in its entirety by the letter A, which consists of the front wall 20, rear wall 21, side walls 22 and 23 and the bottom wall 24. The top edges of the said front, rear and side walls are grooved at 26. The side wall 23 has formed therein an opening 27 for the removable cover 28. The bottom wall 24 has extending therefrom the bosses 29 and has formed therein an opening 30 for the cover 31. A receptacle 32 extends up from the bottom wall 24 and has formed in its side walls journal bearings 33, 34 and 35. A cover 36 with the bracket 37 is provided for the receptacle 32. A journal bracket 38 extends up from the bottom wall 24. A bracket 37a extends from the front wall 20 of the housing A. A cover for the housing A is indicated in its entirety by the letter B and comprises the roof 40 with the front wall 41, the rear wall 42 and the side walls 43 and 44. The lower edges of the latter, front, rear and side walls are grooved at 45. Cross walls 48, 49, 50 and 51 extend from the roof 40. An opening 52 and the bosses 53 are formed with the roof 40. Stanchions each with the portions 55 and 56 extend between the bottom wall 24 of the housing A and the roof 40 of the cover B. A shoulder 57 is formed between said portions.

The portions 55 are threaded at their upper ends and said threaded portions extend through the bosses 53 of the roof 40 and are provided with nuts 58 to clamp the cover B in place. Threaded portions 59 are formed just above the shoulders 57. The portion 56 of each stanchion is shouldered at 61 to form the reduced portion 62 that extends through the boss 29 and is threaded at 63 for the nut 64. A detachable foot 65 is supported on the reduced portion 62 and is clamped to the bottom face of the bottom wall 24 by means of the nut 64.

Detachable covers 66 are supported in the grooves 26 and 45 and are held in place by means of screws 67.

A detachable conveyer frame is designated in its entirety by the letter C and is located within the housing A. The frame C comprises the front wall 72, rear wall 73 and side walls 74 and 75. Cross walls 76 and 77 connect the front wall 72 and the rear wall 73. Similar brackets 78 and 79 extend from the side wall 74, and each have formed therein a guide opening 80 for one of the stanchions already described and have formed therewith the threaded bosses 81. A journal bearing bracket 85 extends from the outer face of the wall 74 and a journal bearing bracket 86 extends from the inner face of said wall 74. From the outer face of the wall 75 extend the brackets 88 and 89 similar to 78 and 79. Each of the brackets 88 and 89 have guide openings 90 similar to 80 and threaded bosses 91 similar to 81. A journal bearing bracket 95 similar to 85 extends from the outer face of the wall 75 and a journal bearing bracket 96 similar to 86 extends from the inner face of the wall 75. A hanger bracket 97 extends from the outer face of the wall 75 and a bracket 98 extends from the bottom face of said wall 75.

A bracket indicated in its entirety by the letter D comprises the horizontal legs 99, 100 and the throat 101 with the flange 102. The leg 99 is located upon the roof 40 of the cover B over the opening 52 and is fastened to said roof by means of the screws 103. A lantern 108 is secured to the flange 102 of the throat 101 by means of the screws 109.

The leg 100 has a forked end 112. An electric bulb 113 is contained in the lantern 108 and has extending from its socket 114 the extension 115, which latter is located between the members of the forked end 112. A screw 116 extends from the extension 115 and with the washer 117 adjustably clamps the bulb 113 in different positions in said lantern. A curved reflector 120 in said lantern is provided for the bulb 113.

A sleeve 125 with the three lens condenser 126 is contained in the throat 101 of the bracket D. An objective lens having the sleeve 127 is in threaded engagement with an opening in the leg 99 of the said bracket D. Journal brackets 128 extend from the leg 99 and have pivoted in their lower ends the flat reflector 130. A bracket 131 on the sleeve 127 of the objective lens has pivoted thereto by means of the pins 132 the plate reflector 133. A perforated lug 134 extends from the reflector 133. An adjusting screw 134$^a$ extends through an opening in the bracket 134 and is in threaded engagement with the bracket 131, and by means of said screw 134$^a$ the reflector 133 can be located in different angular positions.

An electric motor 135 is supported upon the cover 31 of the housing A. On the armature shaft 136 of the said motor is secured one member 137 of an Oldham coupling. In the receptacle 32 is journaled a worm shaft 138 with the second member 139 of the Oldham coupling. A worm 140 is fastened to the shaft 138. A shaft 141 at right angles to the shaft 138 and below the latter is journaled in the receptacle 32. A worm wheel 142 which meshes with the worm 140 is fastened to the shaft 141, and a worm 143 is also fastened to said shaft 141. A cam shaft 147 parallel to the shaft 138 is also journaled in and extends through the receptacle 32. A worm wheel 148 is fastened to the cam shaft 147 and meshes with the worm 143. A fork oscillating cam 150 is fastened to one end of the cam shaft 147, and a fork shifting cam 151 is fastened to the other end of said cam shaft. The driving member 152 of a Geneva movement is also fastened to the cam shaft 147.

In the bracket 98 of the frame C is supported the threaded journal pin 155 on which is journaled the driven member 156 of the said Geneva movement. A spur gear 157 is formed with the said member 156.

A tubular shaft 160 is tightly supported in an opening in the bracket 95 and the cross wall 77 of the frame C. A lower sprocket conveyer driving drum 162 with the pairs of sprocket teeth 163 is journaled on the tubular shaft 160. A combined bevel and spur gear having the bevel teeth 164 and the spur gear teeth 165 is formed with one end of the said drum 162. The teeth 165 are in mesh with the teeth of the spur gear 157.

A second tubular shaft 168 similar to the shaft 160 is fastened in the bracket 96, and in the cross wall 77 of the frame C. A sprocket drum 169 having the pairs of sprocket teeth 170, and similar to the drum 162 is journaled on the shaft 168. A conveyer band 171 with the sprocket openings 172 is supported on the drums 162 and 169, the said openings 172 engaging said teeth 163 and 170 of said drums. Slide channels 175 are fastened to the outer face of the conveyer band 171. Tubular supporting rollers 176 are journaled in the side wall 75 and in the cross wall 77 of the frame C and support the upper member of the conveyer band 171 between the drums 162 and 169.

A vertical shaft 178 is journaled in the bracket 95 of the frame C and in the bracket 48 of the cover B. A bevel gear 179 is fastened to the lower end of the shaft 178 and meshes with the bevel teeth 164 formed with the drum 162. A bevel gear 184 is in frictional engagement with the upper end of the vertical shaft 178. A tapered and threaded lug 183 extends from the lower face of the bevel gear 184 and is split as indicated at 185. A clamping nut 186 engages the lug 183. An upper drum shaft 187 is journaled in a bushing 188 secured in the cross wall 48, the bushing 189 secured in the cross wall 49, the bushing 190 secured in the cross wall 50 and the bushing 191 secured in the cross wall 51. A bevel gear 192 is fastened to one end of the shaft 187 and meshes with the bevel gear 184. A sprocket conveyer driving drum 193 having the sprocket teeth 194 and similar to the sprocket drum 162 is journaled adjacent to one end of the drum shaft 187. Bevel teeth 195 are formed with one end of the drum 193 and said teeth mesh with the bevel teeth 184. A second shaft 198 similar to the shaft 187 and parallel thereto is fastened in the cross walls 48, 49, 50 and 51. A sprocket drum 200 similar to the sprocket drum 193 and having the sprocket teeth 201 is journaled on the shaft 198. A conveyer band 203 similar to the conveyer band 171, with the slide channels 204, is supported on the drums 193 and 200.

An upper sprocket driving drum 206 with the sprocket teeth 207 and similar to the drum 193 is keyed to the shaft 187. Bevel teeth 208 similar to the teeth 195 of the drum 193 are formed with the drum 206.

A drum 209 similar to the drum 200 is journaled on the shaft 198 on a level with the drum 206. A conveyer band 210 similar to the conveyer band 203, with slide channels 211, connects the drums 206 and 209.

The conveyer bands 171 and 203, respectively, with the slide channels 175 and 204 I will herein designate as the pair of conveyers L.

A vertical shaft 215 similar to the shaft 178 is journaled at its lower end in the bracket 85 of the frame C, and its upper end is journaled in the cross wall 51 of the cover B. A bevel gear 216 similar to the bevel gear 184 is in frictional engagement with the upper portion of the shaft 215. A tapered and threaded lug 217 extends from the lower face of the said bevel gear 216 and is split in a manner similar to the bevel gear 184. A clamping nut 218 similar to 186 engages the lug 217. The bevel gear 216 is in mesh with the bevel teeth 208 of the drum 206.

A bevel gear 220 is fastened to the lower portion of the vertical shaft 215.

A tubular shaft 221 similar to the tubular shaft 160 is fastened in the bracket 85 and to the cross wall 76 of the frame C. A lower driving sprocket drum 225 similar to the drum 162 and having sprocket teeth 226 is journaled on the shaft 221. Bevel teeth 227 are formed with one end of the drum 225 and mesh with the bevel gear 220. A lower sprocket drum 228 similar to the drum 169 is journaled on the shaft 229, similar to the shaft 168. The shaft 229 is fastened to the bracket 86 and the cross wall 76 of the frame C.

A conveyer band 230 with the slide channels 231 and similar to the conveyer band 171 connects the drums 225 and 228.

Tubular supporting rollers 235 similar to 176 are journaled in the side wall 74 and in the cross wall 76 of the frame C and support the upper member of the conveyer band 230.

The conveyer band 210 with its slide channels 211 and the conveyer band 230 with its slide channels 231 are herein designated as the pair of conveyers M.

A box shaped trolley track E is shown with the bottom runway rails 240 and the top guide rails 241. A guide fork 242 with the spring fingers 242ª is formed with one end of the track E and at the other end of the said track is formed a similar guide fork 243 that has formed therewith the toothed sector 244 and the spring fingers 245. The said guide forks 242 and 243 are pivoted on the shafts 221 and 160.

A pivot 246 extends from one of the walls of the receptacle 32 and has pivoted thereon the lever F having the arms 247, 248 and 249. The arm 247 has formed therewith the toothed sector 250 which meshes with the teeth 244 of the fork 243. The arm 248 has journaled thereon the cam roller 251. The cam 150 of the cam shaft 147 coacts with the cam roller 251.

A link 252 has one end pinned to the arm 249. The arm 249 engages the contact bar 410 of the automatic electric switch R to be described. A spring 253 has one end fastened to the arm 247 and its other end is fastened to the bracket 37 of the cover 36 of the receptacle 32.

A lever 257 is pivoted at one end to the bracket 38 of the housing A and at its other end is formed the toothed sector 258. The link 252 is pinned to the lever 257.

A box shaped trolley track G similar to E is shown with the bottom runway rails 260, and the top guide rails 261. A guide fork 262 with spring fingers 262ª similar to 242 is formed with one end of the track G, and at the other end of said track G is formed a guide fork 263 with the spring fingers 263ª similar to 243 and the guide fork 263 has formed therewith the toothed sector 264 similar to 244. The said guide forks 262 and 263 are pivoted on the shafts 168 and 229.

A shifting trolley H comprises the body portion or frame 270 with the depending portions 271.

Axles 272 extend through and are fastened to the said depending portions 271. Pairs of rollers 273 are journaled on the axles 272. The rollers 273 run on the runway rails 240 and are guided by the top guide rails 241.

An arm 276 has one end fastened to the top face of the body portion 270 of the trolley H and to its other end is fastened a spring finger having the tapered members 277. A second arm 278 similar to 276 is also fastened to said body portion 270 and to its other end is fastened a spring finger having the tapered members 279 similar to 277. A third spring finger with the tapered members 280 extends from the adjacent ends of the arms 276 and 278. Guide openings 283 are formed in the depending portions 271 for the shifting rope 284. A guide pulley 285 is journaled on a screw pivot 286 extending from the bracket 78. A guide pulley 287 is journaled on a pivot 288 extending from the bracket 88. A guide pulley 289 is journaled on a pin 290 extending from the bracket 89. A guide pulley 291 is journaled on a pin 292 extending from the bracket 79.

A double grooved drum 296 has formed therewith the spur gear 297. The said drum is journaled on the pivot 298. The pivot 298 at one end has formed therewith the reduced portion 299 with the threaded end 300. The portion 299 is supported in the bracket 97 and clamped in place by the nut 301. A second reduced portion 302 is formed with the pivot 298, which has extending therefrom the squared end 303. A threaded end 304 extends from the squared end 303. A spring tension adjusting disc 305 with the holes 306 and the sleeve 307 with the slot 308 is pivoted on the reduced portion 302 of the said pivot 298. A fork 312 has one end engaged with the squared end 303 and has extending from it the locking pin 313 which can lock with the holes 306. A nut 314 engages the threaded end 304 to hold the fork 312 in place.

A spiral spring 317 is located within the drum 296 and has one end 318 fastened to said drum and its other end 319 is secured in the slot 308 of the disc 305. The shifting rope 284 winds around the double grooved drum 296 and the pulleys 289, 291, 285 and 287. The ends of the rope 284 enter a cavity in the drum 296 and are tightened therein by means of a plug 320. A pair of clamps 324 are fastened to the rope 284 between the depending portions 271 of the trolley 270. Springs 325 encircle the rope 284 between the clamps 324 and the said depending portions 271. A shifting lever I with the arms 330 and 331 is pivoted on a screw pin 332 supported on the bracket 37ª of the housing A. A threaded sector 333 is formed with the arm 330 and meshes with the spur gear 297. A roller 334 is journaled in the arm 331 and contacts with the shifting cam 151 on the cam shaft 147.

A second trolley J similar to the trolley H is supported on the trolley track G. An arm 335 similar to the arm 276 has one end fastened to the top face of the body portion of the trolley J and at its other end is fastened a spring finger 336 similar to 277. A second arm 337 similar to 278 is also fastened to the body portion of the trolley J and at the other end of the arm 337 is fastened a spring finger 338 similar to 279. A third spring finger 339 similar to the one having the tapered member 280 extends from the adjacent ends of the arms 335 and 337.

Brackets 342 and 343 extend from the side walls 76 and 77 and support the lower front connecting slide channel 344 and the lower rear connecting slide channel 345. A front upper connecting slide channel 346 and a rear upper connecting slide channel 347 are secured to the cross walls 49 and 50 of the cover B.

To the brackets 342 is fastened a lower slide stop 350, and to the brackets 343 is fastened a similar lower slide stop 351.

Brackets 353 and 354 extend from the cross walls 49 and 50 and support the upper slide stops 355 and 356. Brackets 360, 361 extend from one of the detachable covers 66 and support the upper and lower slide stops 362 and 363. Brackets 365 and 366 extend from the opposite cover 66 and respectively support the upper and lower slide stops 368 and 369.

Referring particularly to Figs. 16 and 17 the projector with the housing A, cover B and the detachable covers 66 is located in the cabinet designated in its entirety by the letter P, having the bottom 380, side walls 381 382, front wall 383 and the rear wall 384 with the curved roof 385. A screen 388 of translucent glass is located in a frame 389 of the front wall 383. An inclined reflector plate 390 is secured to the curved roof 385 of the cabinet.

Referring particularly to Fig. 18 there is indicated the electric motor 135, the electric bulb 113, the electric push button Q, the automatic electric switch R and the electric switches 394 and 395.

The push button Q comprises the socket 398 of electric insulating material with the spring contact fingers 399 and 400. A shell 401 is connected to the socket 398 and has formed therein the guide strips 402. A metallic plunger 403 has formed therewith the collar 404 and extends into the shell 401 and between the guide strips 402. A spring 405 extends around the plunger 403 in the shell 401, between the guide strips 402 and the collar 404. The automatic electric switch R comprises the contact bar 410 which is engaged by the end of the arm 249 of the lever F. The contact bar 410 has formed therewith the contact projection 411. A contact spring piece 412 with the rests 413 and 414 is located in the switch for the lower side of the contact bar 410. A contact 415 in the switch R is provided for the upper side of the said contact bar 410. Wires 419 and 420 lead from a source of electricity and have respectively connected thereto the fuses 421 and 422. A wire 423 connects the wire 419 with the electric switches 394 and 395. A wire 424 leads from the switch 394 to the contact 415 of the automatic switch R and a wire 416 connects the wire 424 and the contact spring finger 400 of the push button Q. A wire 425 connects the switch 395 and one pole of the electric bulb 113. A wire 426 extends from the other pole of the said electric bulb and connects with the wire 420. A wire 427 connects the wire 426 with one of the brushes of the electric motor 135. A wire 428 leads from the other brush of the electric motor and connects with the contact spring piece 412. A wire 429 connects the contact spring piece 412 and the spring contact 399 of the push button Q.

To operate the projector, the slides K are located in the corresponding slide channels 175 and 204 and in the corresponding slide channels 231 and 211. The electric bulb 113 is lit by means of the switch 395 and the electric motor 135 is started by means of the switch 394, with a wire 430 connecting the wires 424 and 428, when a continuous operation of the projector is required, eliminating the push button Q and the automatic switch R.

The rays of light from the electric bulb 113 enter the condenser 126 and pass through the slide which is located in front of the condenser, the slide in this position being indicated by K'. The rays of light next impinge on the plate reflector 130 and are reflected through the objective lens having the sleeve 127. From the objective lens the light rays can project on a horizontal screen above the projector, or they can be deflected on a vertical screen by the plate reflector 133, or when the cabinet P is used the light rays are reflected by the reflector plate 390 to the screen 388.

The reflector 120 increases the volume of the light rays emitted from the electric light bulb 113. Rotation is transmitted from the armature shaft 136 to the worm shaft 138. The worm 140 of the shaft 138 transmits rotation to the worm wheel 142 by means of which the shaft 141 is turned. The worm 143 on the shaft 141 turns the worm wheel 148 on the cam shaft 147. The cams 150, 151 and the driving member 152 of the Geneva movement turn with said cam shaft.

The cam 151 actuates the roller 334 of the shifting lever I. The toothed sector 333 of the lever I oscillates the spur gear 297 connected to the double grooved drum 296, which is thereby oscillated. Referring particularly to Fig. 9 the roller 334 from the position there shown is about to travel down the face 151$^a$ of the rotating cam 151, which permits the tension of the spiral spring 317 to turn the drum 296 in the direction of the arrow 375. This movement of the drum moves the shifting rope 284 in the direction of the arrow 376. Thereby the shifting trolley H is moved in the direction of the arrow 376 and the shifting trolley J is moved in the direction of the arrow 377. By this means one of the slides K is moved from the pair of conveyers L to its projecting position indicated at K', and the previous slide which was located at the position K' is moved to pair of conveyers M and takes the position K$^2$. At the same time one of slides K of the pair of conveyers M is moved at the rear of the projector to the position K$^3$ behind the plate reflector 130. Previously thereto the slide that was in the position K$^3$ is moved to the pair of conveyers L as indicated at K$^4$. The distance traveled by the trolleys H and J in the movements just described is controlled by the coaction of the roller 334 and the shifting cam 151, and after the slides are positioned as just described they remain at rest for an instant of time. During the interval of rest the spring fingers having the tapered members 279, 280 and 277 of the trolley H and the spring fingers having the tapered members 338, 339 and 336 disengage from between the slides and are replaced by the spring fingers 245, 242$^a$, 262$^a$ and 263$^a$. The means actuating the spring fingers will be described hereafter.

The cam roller 334 is now in contact with the lower portion of the cam indicated at 151$^b$ and the rollers begin to travel on the cam surface 151$^c$, by means of which the toothed sector 333 moves upwardly and turns the drum 296 to wind up the spiral spring 317. This moves the shifting rope 284 in a direction opposite the arrows 376 and 377.

The drum 296 turns in the direction just described until the roller 334 reaches the point 151$^d$ on the cam surface of the cam 151. At this instant the spring fingers having the tapered members 279, 280 and 277 of the trolley H and the spring fingers having the tapered members 338, 339 and 336 move in mesh with the spaces between the slides as shown specially in Fig. 1, and at the same time the spring fingers 245, 242$^a$, 262ª and 263ª are moved out of mesh with said slides. During the period that the trolleys H and J move in directions opposite to the arrows 376 and 377 the conveyer L moves forward toward the front of the projector one of the slides K and the conveyers M move to the rear of the projector one of the slides K.

Referring to Figs. 7, 9 and 13 the driving member 152 of the Geneva movement on the cam shaft 147 engages the driven member 156 thereof with the rotation of the cam shaft 147, which intermittently turns the said driven member 156, of the Geneva movement. By this means the sprocket drum 162 is turned. At the same time the vertical shaft 178, the drum shaft 187, the sprocket drum 193, the sprocket drum 206, the vertical shaft 215 and the sprocket drum 225 are turned, to produce a movement in each of the pair of conveyers for one slide in each.

To take up the back lash of the bevel gears 179, 184, 192, 208, 216 and 220, the bevel gears 184 and 216 are turned to take up said back lash, and then clamped in place respectively by means of the clamping nuts 186 and 218.

The guide fork 243 with its spring fingers 245 and the runway rails 240, top guide rail 241 and the guide fork 242 with its spring fingers 242ª and the guide fork 263 with the spring fingers 263ª, the runway rails 260, top guide rails 261 and the guide fork 262 with its spring fingers 262ª are actuated as follows. When the cam shaft 147 turns, the roller 251 is actuated by the cam 150. By this means the toothed sectors 250 and 258 respectively oscillate the guide forks 243 and 263. It will be noted by the construction as indicated specially in Figs. 5 and 12, that the trolleys H and J oscillate with their rails together with the guide forks 243, 242, 263 and 262.

When an interrupted mode of operation is required, the wire 430 is eliminated, so that the push button Q and the automatic switch R can be used. By means of these appurtenances, the projector is stopped by means of automatic switch R and started by means of the push button Q. With this mode of operation, the cam roller 251 as indicated in Fig. 12 is about to move up, by means of the fork oscillating cam 150, and the tapered members 279, 280 and 277 of the trolley H and the spring fingers 338, 339 and 336 of the trolley J enter between the slides. At the same time the arm 249 of the lever F moves the contact bar 410 of the switch R, from the rest 413 to the rest 414, and breaks the electric circuit of the electric motor 135, and the projector then stops, but the electric bulb 113 remains energized and projects the picture of the slide K' to its coacting screen for any time desired. When the push button Q is pushed in, the metallic plunger 403 contacts with the metallic contact fingers 399 and 400 and closes the electric circuit to again start the electric motor 135. The push button Q must continue to close the electric circuit of the motor while the roller 251 of the lever F is in contact with the cam surface 150ª of the cam 150.

Having described our invention what we desire to secure by Letters Patent and claim is:

1. In an optical projector the combination of two pairs of conveyers, the conveyers of each pair coacting to simultaneously convey a plurality of slides, means to simultaneously move the conveyers and shifting means to simultaneously shift the slides, one after the other, at each end of the conveyers from each pair of conveyers to a space between them, said shifting means thereafter shifting the slides one after the other to one of the pairs of conveyers at one end thereof and to the other pair of conveyers at the other end thereof.

2. In an optical projector the combination of two pairs of conveyers, a pair of drums for each conveyer, the conveyers of each pair one over the other, means to simultaneously move the conveyers, each pair of conveyers adapted to convey a plurality of picture slides at right angles to the axes of the drums and means to shift the slides from one pair of conveyers to a position between the conveyers, said means thereafter simultaneously shifting the slides from the position between the conveyers to a pair of the conveyers.

3. In an optical projector the combination of two pairs of conveyers parallel to each other and spaced apart, drums for the conveyers, means to drive each pair of conveyers in directions at right angles to the axes of the drums, the direction of the movement of one pair of conveyers opposite to the direction of the other pair and means to simultaneously and quickly shift a plurality of slides one after the other from each pair of conveyers to the space between them, the same means thereafter quickly shifting the slides one after the other from said spaces each to the other conveyer.

4. In an optical projector the combination of a pair of conveyers one over the other, a second pair of conveyers one over the other and spaced from the first pair, a pair of drums for each pair of conveyers, each pair of conveyers adapted to loosely support a plurality of slides, means to simultaneously drive the conveyer in directions at right angles to the axes of their drums and opposite to each other, means to shift the slides one after the other from one pair of conveyers to the space between them, means to detain the slides in said space for each an instant of time, means to shift the slides from said space to the second pair of conveyers, the second pair of conveyers moving the slides to rear of the projector, means to shift the slides to the space between the conveyers at the rear of the projector, means to shift the slides to the first pair of conveyers, and means to drive the first pair of conveyers to locate the slides in their original positions.

5. In an optical projector the combination of a cam shaft, means to turn the cam shaft, a driving member of a Geneva movement on the cam shaft, a detachable conveyer frame for the projector, a journal pin extending from said frame, a driven member of said Geneva movement journaled on said pin, a spur gear integral with said driven member, a lower stationary shaft secured in said frame, a sprocket conveyer driving drum journaled on the latter shaft, spur gear teeth formed with the drum meshing with the spur gear integral with the driven member of the Geneva movement, bevel teeth formed with said drum, a housing for said frame, a cover for said housing, a vertical shaft journaled at one end in said cover and at the other end in the conveyer frame, a bevel gear fastened to the vertical shaft meshing with the bevel teeth of the drum, a second bevel gear fastened to the vertical shaft at its upper end, an upper sprocket drum shaft journaled in said cover, a second sprocket conveyer driving drum journaled on the latter shaft, a bevel gear fastened to the latter shaft meshing with the bevel gear at the upper end of the vertical shaft to drive the drum shaft, bevel teeth formed with the second drum also meshing with the bevel gear at the upper end of the vertical shaft, a third driving drum fastened to the upper drum shaft, bevel teeth formed with the latter drum, a second vertical shaft journaled at one end in said cover and at the other end in the conveyer frame, a bevel gear fastened to the upper end of the second vertical shaft meshing with the bevel teeth of said third drum, a bevel gear fastened to the lower end of said second vertical shaft, a second lower stationary shaft secured in said frame, a lower driving sprocket drum journaled on said second lower stationary shaft and bevel teeth formed with the latter drum meshing with the bevel gear at the lower end of the second vertical shaft.

6. In an optical projector the combination of a trolley, an oscillating track for the trolley, arms secured to the trolley, a pair of spring fingers fastened to the trolley between the arms, a pair of spring fingers at the outer ends of the arms, a pair of guide forks with spring fingers on the track spaced to register with the spring fingers on the trolley between said arms and either one of the spring fingers at the ends of the arms and means to oscillate the tracks with the trolley.

7. In an optical projector the combination of a trolley for the front thereof and a trolley for the rear of the projector, a pair of arms extending from each trolley, a pair of spring fingers fastened to each trolley between the arms, a pair of spring fingers at the outer end of each arm, a track for each trolley, a pair of guide forks with spring fingers for each track spaced to register with the spring fingers on each trolley between the arms thereof and either one of the spring fingers at the end of one of its arms, a pair of conveyers adapted to move slides in position between the spring fingers at the end of one of said arms and the spring fingers between said arms on one trolley, a second pair of conveyers adapted to move slides in position between the spring fingers at the end of one of the arms of the second trolley and the spring fingers between the arms of the second trolley, slide channels between the pairs of conveyers at the front and rear of the projector, means to simultaneously oscillate both the tracks with their trolleys, engaging thereby with the forks and spring fingers of one track and one trolley, a slide of one of the conveyers and the slide in its adjacent slide channels between the conveyers and simultaneously engaging the forks and spring fingers of the second track and trolley, a slide of the second conveyer and its adjacent slide channels between the conveyers, means to move both tracks with their trolleys and appurtenances to oscillate them to their original positions.

8. In an optical projector the combination of a pair of oscillating tracks, a trolley movably supported on each track, means on each trolley to engage a pair of slides, a toothed sector formed with each track, a pair of levers each with a toothed sector pivoted in the projector, the sectors meshing respectively with the toothed sectors of the tracks, a link connecting the levers, a cam roller journaled on an arm of one of the levers, a rotating cam shaft journaled in the projector and a cam fastened to the cam shaft contacting with said roller.

9. In an optical projector the combination of a housing, a detachable conveyer frame connected to the housing, guide pulleys journaled in the frame, a pivot in the frame, a drum journaled on the pivot, a shifting rope with its ends fastened to the drum extending over the said drum and bearing on said guide pulleys, a pair of shifting trolleys fastened to the shifting rope, a pair of arms carried by each trolley, a pair of spring fingers between each pair of arms, a pair of spring fingers at the end of each arm, a spring tension adjusting disc adjustably supported on said pivot, a spiral spring with one end fastened to the drum and its other end fastened to said disc, a spur gear integral with said drum, a lever pivoted in the housing and having a toothed sector formed therewith, said sector meshing with said spur gear, a roller journaled in an arm of said lever, a rotating cam shaft in the housing and a cam fastened to said cam shaft, contacting with said roller.

10. In an optical projector the combination of a housing, a shifting trolley for picture slides in the housing, a trolley track for the trolley, a toothed sector formed with the track, a lever with a toothed sector at one end pivoted in the housing of the projector the teeth of said sectors meshing with each other, an automatic electric switch in the housing, a movable contact bar for the electric switch, the said lever engaging said contact bar, a cam roller journaled in an arm of said lever, a rotating cam contacting with said roller, and electric motor in the housing in circuit with said automatic switch and an electric push button in electric parallel with said switch.

11. In an optical projector the combination of a housing, a shifting trolley for picture slides in the housing, a trolley track for the trolley, a toothed sector formed with the track, a lever with a toothed sector at one end pivoted in the housing, the teeth of said sectors meshing with each other, a cam roller journaled on an arm of said lever, a rotating cam contacting with said roller, a cam shaft for said cam, an electric motor in the housing to turn the cam shaft, an electric light bulb in parallel with said electric motor, an electric switch for the motor and an electric switch for the electric light bulb.

12. In an optical projector the combination of a plurality of shafts for conveyer drums, gears connecting the shafts and drums to simultaneously rotate them, one of said gears having a tapered slit lug exteriorally threaded formed therewith, and a clamping nut for said lug to clamp it with its gear in operative position to its shaft.

13. In an optical projector the combination of a housing, two pairs of conveyers for picture slides in the housing, a pair of shifting trolleys in the housing coacting with the conveyers, a pair of depending portions for each trolley, means on the trolleys to engage the slides, a rope in the housing, means to move the rope, the said rope extending through the depending portions of the trolleys, clamps fastened to the rope between the depending portions of each trolley, a pair of springs encircling the rope between the depending portions of each trolley and the clamps between the said depending portions.

14. In an optical projector the combination of two pairs of conveyors, each pair of conveyors adapted to support a multiplicity of slides, means to move each pair of conveyors with its slides in opposite directions, shifting devices in line with the opposite ends of the conveyors, adapted to engage the terminal slide located at the forward end of the direction of motion of the respective conveyors and shift the slides independently of the other slides to the rear end of the other conveyor.

15. In an optical projector the combination of two pairs of conveyors, slide channels fastened to the conveyors adapted to loosely engage slides, a trolley in line with the opposite ends of the conveyors, a pair of arms with spring fingers at their ends extending from each trolley, means to longitudinally move the trolleys and means to swing the trolleys, the trolleys adapted to pick up the terminal slide from the forward end of each conveyor and move the slides to the opposite conveyor.

16. In an optical projector the combination of two pairs of conveyors, means on each pair of conveyors to loosely engage slides, means to move the conveyors in opposite directions and means at each end of the conveyors to shift the slides at the ends of the conveyors from one to the other.

17. In an optical projector the combination of two pairs of conveyors, the conveyors of each pair one over the other, slide channels attached to each conveyor, a pair of slide channels of each pair of conveyors adapted to loosely support a slide and shifting means at the ends of the conveyors adapted to shift the slides from one pair of conveyors to the other.

Signed at the borough of Manhattan, city of New York, in the county of New York and State of New York, this 12th day of February, A. D. 1921.

OTTO EDWARD ENELL.
JOHN ERNEST MEYER.

Certificate of Correction.

It is hereby certified that the name of the assignee in Letters Patent No 1,489,632, granted April 8, 1924, upon the application of Otto Edward Enell, of Jersey City, New Jersey, and John Ernest Meyer, of New York, N. Y., for an improvement in "Automatic Optical Projectors," should have been written and printed as *Victor C. Thorne* instead of " Victor Thorne," as shown by the records of assignments in this office; and that the said Letters Patent should be read with this correction therein that the same may conform to the record of the case in the Patent Office.

Signed and sealed this 20th day of May, A. D. 1924.

[SEAL.]

KARL FENNING,
*Acting Commissioner of Patents.*